3,264,130
PIGMENT AND PROCESS OF PRODUCING SAME
Robert K. Mays, Havre de Grace, Md., assignor to J. M. Huber Corporation, Monmouth, N.J., a corporation of New Jersey
No Drawing. Filed Aug. 27, 1962, Ser. No. 219,713
30 Claims. (Cl. 106—292)

This invention relates to the process of forming new reaction products of reactive siliceous materials and divalent basic metal compounds and to the products so formed.

The new reaction products resulting from the process of this invention are finely divided pigmentary materials which consist predominantly of a metallo siliceous composition and are characterized by particle sizes in the range of 0.025 to 5 microns in diameter. These pigments are usually white, but depending on the starting materials, are not so restricted.

These reaction products can be used in a variety of applications, such as fillers for paper and for rubber compounds, conditioners for pulverulent materials including common salt, chemical purifiers, phosphorescent compounds, ceramics, catalysts, blocking agents and light stabilizers for plastics, in paints and other protective coatings, as extenders for prime pigments such as $TiO_2$ in paper, paints, rubber compounds and plastics.

Because of the important commercial demand for finely divided inorganic pigments such as metal silicates, many prior art procedures have been developed for their production; for example, this type of pigment is produced by chemical reactions in the vapor phase, chemical precipitating methods, subliming methods, and high temperature solid phase fusing reactions. These methods at best are not completely satisfactory because of either high cost or inferior products. However, due to the demand for such pigments, these methods of producing them have been used despite their weaknesses.

I have discovered a new, convenient and economical method of producing metal silicate products. The method generally consists of slurrying in the desired molar ratios, a particular group of reactive siliceous materials and a divalent basic metal compound and heating the slurry for a sufficient time to complete the reaction.

It is an object of this invention to provide a new economical process for producing metal silicate pigments.

Another object of this invention is to form novel metal silicate pigments.

Other objects and advantages of this invention will be apparent from the following specification.

By means of the new process of this invention, it is possible to react divalent basic metal oxides or hydroxides as well as mixtures of different divalent basic metal oxides or hydroxides with reactive silica in any desired molar ratio of metal oxide to silica at elevated temperatures for a time sufficient to complete the reaction, thereby producing metal silicates. The various metal oxides and hydroxides used require different times to complete the production of corresponding metal silicate. For example, a slurry of calcium oxide and reactive silica reacts slowly at room temperature but can be completely reacted by heating the reaction slurry at about 100° C. for an hour. On the other hand, a reaction slurry of zinc oxide and reactive silica requires prolonged heating at about 100° C. for 8 hours to complete the reaction. At atmospheric pressure, the time normally required to complete the reaction varies between 1 and 8 hours. It is possible to shorten the reaction time by heating under pressure. For example, a reaction slurry of zinc oxide and reactive silica requires boiling under a pressure of 120 to 140 pounds per square inch gauge for less than 4 hours to complete the reaction. A reaction slurry of lead oxide and reactive silica which normally requires 2–4 hours of heating at about 100° C. under atmospheric pressure to complete the reaction, can be completely reacted within 1 hour by boiling under a pressure of 120 to 140 pounds per square inch gauge.

Many finely divided silica-containing materials are not suitable for use under the conditions of my process. The silica must be a finely divided reactive silica such as those disclosed in copending applications Serial No. 144,168, filed October 10, 1961, and Serial No. 149,964, filed November 3, 1961. These siliceous materials are prepared by reacting strong mineral acids with either calcined or uncalcined clay under carefully controlled conditions.

The reactive silica-containing materials disclosed in applications Serial Nos. 144,168 and 149,964 are finely divided discrete particles which are phylloidal (leaf or wafer-like) in shape with a great width to thickness ratio or thinness. By analysis these reactive silica materials contain up to about 85% $SiO_2$ with not greater than 15% of other oxides and at least 5% bound water. The reactive siliceous materials are further characterized by having their total surface areas constituted by up to 90% by measurable porosity in the elementary particles. The BET surface area of these phylloidal reactive siliceous materials is generally in the range of 40 to 130 square meters per gram in the case of the materials produced from uncalcined kaolin clay and in the range of 300 to 500 square meters per gram in the case of the materials produced from calcined kaolin clay. The method of determining BET surface area is the well-known Brunauer, Emmett, and Teller method, "BET Multilayer Absorption Theory," Journal of the American Chemical Society, volume 60, page 309 (1938).

The reactive siliceous materials are further characterized structurally as having the atoms of silicon, hydrogen and oxygen linked in an orderly laminar arrangement giving the individual particles their distinctly phylloidal form and providing reactive silanol (SiOH) groups at their surfaces to a concentration of at least 1.0 micromol per square meter of their flat or particle forming surface area.

It is speculated that the presence of these reactive silanol groups results in the ability of these phylloidal reactive siliceous materials to react with oxides and hydroxides of divalent basic metals to form finely divided metal silicates in accordance with this invention.

The compounds found to be particularly useful in the process of this invention are those of metals found in Groups II–A, II–B and IV–A of the Periodic Chart of Elements; for example, CaO, MgO, ZnO, $Ba(OH)_2$ and PbO, as well as naturally occurring mixtures of some of these elements, e.g. dolomitic lime.

While it is possible to react the phylloidal siliceous materials with the divalent metal compound in any suitable molar ratio such as 1 mol of metal oxide per 10 or more mols of silica or up to about 10 mols of metal oxide per mol of silica, it has been found most convenient to carry out the process wherein the molar ratio of metal oxide to silica is from about 1 to 4 to about 4 to 1. The products within this range are considered to have the most desirable properties.

The products of this invention are further characterized as being finely divided powders of a pigmentary nature with from at least 60% to 100% of the BET surface area of each particle being flat surface with the remainder, if any, attributable to pores. The BET surface areas of the products are independent of the starting materials and vary from about 5 square meters per gram to about 500 square meters per gram. The particle sizes of the products vary from .025 micron to 5 microns in diameter. The morphology of these products depends upon and is similar to the phylloidal siliceous reactant. The chemical composition of the products depends upon the residual metal oxide content, generally up to about 15% $Al_2O_3$, of the phylloidal silica and the metallic reactants used as a starting material. The predominant compositions formed by following the methods of this invention are metal silicates. X-ray diffraction studies indicate that these products are new and are normally crystalline; however, the magnesium silicate product appears to be amorphous.

The degree of crystallinity and the crystal size of the reaction products depend to a certain extent upon the length of reaction time and purity of the reactive phylloidal silica. A comparison of the BET surface areas of the products and a dry mix of the reactants indicates whether or not a reaction has taken place.

The following examples are illustrative and are not intended to limit the scope of the invention.

*Example I*

47 grams of reactive silica produced in accordance with Example A of Serial No. 144,168 were slurried in 1275 grams of water with 178 grams of $Ba(OH)_2 \cdot 8H_2O$ and heated to 100° C. This temperature was maintained for 2 hours. The reaction mixture was cooled and the product was recovered by filtration and dried. The product was a white, finely divided powder containing 1 mol of BaO combined with 1 mol of $SiO_2$ and having a BET surface area of 6.1 m.$^2$/g. with no measurable porosity.

*Example II*

The procedure of Example I was repeated, except the reaction time was extended to 4 hours. The product recovered was similar to that in Example I but had 14% porosity and a BET surface area of 6.1 m.$^2$/g.

*Example III*

The procedure of Example I was repeated using 59.3 grams of reactive silica and 165.7 grams of lead oxide slurried in 1275 grams of water, except the reaction time was extended to 4 hours. The resulting product was a white, finely divided powder containing 1 mol of PbO combined with 1 mole of $SiO_2$ and having a BET surface area of 14.6 m.$^2$/g. of which 9% is porosity.

*Example IV*

78 grams of the product of Example B of Serial No. 144,168 was slurried in 1275 grams of water with 147 grams of $Ba(OH)_2 \cdot 8H_2O$ and heated to 100° C. This temperature was maintained for 2 hours. The reaction mixture was then cooled and the product was recovered by filtration and dried. The resulting product was a white, finely divided powder containing 1 mol of BaO combined with 2 mols of $SiO_2$ and having a BET surface area of 17 m.$^2$/g. of which 18% is porosity.

*Example V*

The procedure of Example IV was repeated except the reaction time was extended to 4 hours. The resulting product was a finely divided, white powder containing 1 mol of BaO combined with 2 mols of $SiO_2$ and having a BET surface area averaging 22 m.$^2$/g. of which 21.5% is porosity.

*Example VI*

The procedure of Example IV was followed using 94 grams of reactive silica and 131 grams of PbO slurried in 1275 grams of water. The resulting product was a white, finely divided powder containing 1 mol of PbO combined with 2 mols of $SiO_2$ and having a BET surface area of 21.2 m.$^2$/g. of which 14% is porosity.

*Example VII*

The procedure of Example VI was followed except the reaction time was extended to 4 hours. The resulting product was a white, finely divided powder containing 1 mol of PbO combined with 2 mols of $SiO_2$ and having a BET surface area averaging 22.15 m.$^2$/g. of which an average of 11.5% is porosity.

*Example VIII*

The procedure of Examples I through VII were repeated replacing the reactive silica with an equimolar amount of the reactive phylloidal silica produced in Example A of Serial No. 149,964. In each case, a white, finely divided powder was produced.

*Example IX*

195 grams of the reactive silica produced according to Example B of Serial No. 144,168 were slurried in 2 liters of water, and 105 grams of MgO were added. The reaction mixture was heated to 100° C. and kept at that temperature for 2 hours. The product was recovered by filtration and dried. The product was a white, finely divided powder containing 1 mol of MgO combined with 1 mol of $SiO_2$ and having a BET surface area of 425.8 m.$^2$/g. of which 32% is porosity.

*Example X*

The procedure of Example IX was repeated except the reaction time was extended to 4 hours. The product was a white, finely divided powder containing 1 mol of MgO reacted with 1 mol of $SiO_2$ and having a BET surface area of 433.6 m.$^2$/g. of which 36% is porosity.

*Example XI*

The procedure of Example IX was followed using 237 grams of the reactive silica and 63 grams of MgO. The resulting product was a white, finely divided powder containing 1 mol of MgO combined with 2 mols of $SiO_2$ and having a BET surface area of 344.3 m.$^2$/g. of which 18% is porosity.

*Example XII*

The procedure of Example XI was followed except the reaction time was extended to 4 hours. The product was similar but the BET surface area was increased to 364.3 m.$^2$/g.

*Example XIII*

207 grams of the reactive silica produced according to Example C of Serial No. 144,168 were slurried in 2 liters of water and 105.6 grams of ZnO were added. The reaction slurry was heated to 100° C. and that temperature was maintained for 8 hours. The reaction mixture was filtered and the precipitate was recovered and dried. The product was a white, finely divided powder containing 1 mol of ZnO combined with 2 mols of $SiO_2$ and having a BET surface area of 54.7 m.$^2$/g. of which 9% is porosity.

*Example XIV*

134 grams of the siliceous product of Example B of Serial No. 144,168 was slurried in 400 ml. of water and 108.5 grams of lime was added. The reaction mixture was heated to 100° C. and kept at that temperature for 1 hour. The product was recovered by filtration and dried. The product was a white, finely divided powder containing 1 mol of CaO combined with 1 mol of $SiO_2$.

*Example XV*

The procedure of Example XIV was followed using 54.25 grams of lime. The product was a white, finely divided powder containing 1 mol of CaO combined with 2 mols of $SiO_2$.

*Example XVI*

36 pounds of the product of Example A of Serial No. 144,168 were slurried in 280 pounds of water and 14 pounds of dolomitic lime (an equimolar mixture of CaO and MgO) were added. The reaction mixture was heated to 100° C. and this temperature was maintained for 4 hours. The product was recovered by filtration and dried. The product was a white, finely divided powder containing a combined total of 1 mol of $CaO \cdot MgO$ combined with 2 mols of $SiO_2$ and having a BET surface area of 194.2 m.²/g. with no measurable porosity.

While a natural mixture of calcium and magnesium oxides was used in this example, an artificial mixture can be used with equal results.

*Example XVII*

The procedure of Examples IX through XVI was repeated by replacing the siliceous material used with an equimolar amount of the product of Example C of Serial No. 149,964 wherein the kaolin clay used was calcined at 800° C. for 2 hours. In each case, a white, finely divided powder was obtained which corresponded to the products of Examples IX through XVI.

*Example XVIII*

177 grams of the siliceous material produced from kaolin clay calcined at 800° C. for 2 hours as described in Example C of Serial No. 149,964 were slurried with agitation in 1333 mols of water in a 3 liter beaker equipped with a stirrer. 51 grams of MgO were added and the mixture was heated to 100° C., this temperature was maintained for 4 hours. The product was recovered by filtration and dried. The product weighed 212.7 grams and was a white, finely divided powder containing 1 mol of MgO combined with 2 mols of $SiO_2$ and having a BET surface area of 452.5 m.²/g.

*Example XIX*

1135 grams of the reactive silica produced according to Example C of Serial No. 144,168 and 586 grams of zinc oxide were slurried in sufficient water to make a slurry containing 15% solids. The reaction mixture was boiled at 172° C. under a pressure of 120 p.s.i.g. for one hour. The product was recovered by filtration and dried. The product was a white, finely divided powder containing one mol of zinc oxide combined with two mols of $SiO_2$ and having a BET surface area of 47.9 m./²g.

*Example XX*

The procedure of Example XIX was repeated except the reaction time was extended to 4 hours. The product was a white, finely divided powder containing one mol of zinc oxide combined with two mols of $SiO_2$ and having a BET surface area of 51.5 m.²/g.

*Example XXI*

497 grams of the reactive silica produced according to Example C of Serial No. 144,168 and 692 grams of PbO were slurried in sufficient water to make a slurry containing 15% solids. The reaction mixture was boiled at 175° C. under a pressure of 130 p.s.i.g. for 0.5 hour. The product was recovered by filtration and dried. The product was a white, finely divided powder containing 1 mol of PbO combined with 2 mols of $SiO_2$ and having a BET surface area of 8.2 m.²/g.

*Example XXII*

The procedure of Example XXI was repeated except the reaction time was extended to 2 hours. The product was a white, finely divided powder containing 1 mol of PbO combined with 2 moles of $SiO_2$ and having a BET surface area of 8.1 m.²/g.

*Example XXIII*

675 grams of the reactive silica produced according to Example C of Serial No. 144,168 and 1300 grams of $Ba(OH)_2 \cdot 8H_2O$ were slurried in sufficient water to make a slurry containing 15% solids. The reaction mixture was boiled at 172° C. under a pressure of 120 p.s.i.g. for 2 hours. The product was recovered by filtration and dried. The product was a white, finely divided powder containing 1 mol of BaO combined with 2 mols of $SiO_2$ and having a BET surface area of 47.9 m.²/g.

*Example XXIV*

1125 grams of the reactive silica produced according to Example C of Serial No. 144,168 and 296 grams of MgO were slurried in sufficient water to make a slurry containing 15% solids. The reaction mixture was boiled at 172° C. under a pressure of 120 p.s.i.g. for 2 hours. The product was recovered by filtration and dried. The product was a white, finely divided powder containing 1 mol of MgO combined with 2 mols $SiO_2$.

It is to be understood that the foregoing examples are illustrative and that by using each of the siliceous products disclosed and claimed in Serial Nos. 144,168 and 149,964, pigments of the type described above were produced. The reaction conditions are to some extent dependent upon the starting siliceous material and modifications may be made which fall within the scope of the following claims.

I claim:

1. A process for producing finely divided metal silicates of a particle size in the range of .025 to 5 microns in diameter which comprises forming an aqueous slurry containing at least 1 mol of a metal compound selected from the group consisting of metal oxides and hydroxides of barium, lead, magnesium, calcium, zinc, and mixtures thereof per 4 moles of finely divided reactive silica selected from the group consisting of phylloidal silica containing a concentration of at least 1 micromol of silanol groups per square meter of flat surface area and a BET surface area of 40 to 130 square meters per gram, and phylloidal silica containing a concentration of silanol groups of at least 20 micromols per square meter of their flat surface area and a BET surface area of 300 to 500 square meters per gram, heating the slurry to from about 100 to 175° C. for a time sufficient to complete the reaction and recovering the product.

2. The process according to claim 1 wherein the metal silicate is barium silicate and the metal compound is barium hydroxide.

3. The process according to claim 1 wherein the metal silicate is lead silicate and the metal compound is lead oxide.

4. The process according to claim 1 wherein the metal silicate is magnesium silicate and the metal compound is magnesium oxide.

5. The process according to claim 1 wherein the metal silicate is a zinc silicate and the metal compound is zinc oxide.

6. The process according to claim 1 wherein the metal silicate is calcium-magnesium silicate and the metal compound is a mixture of magnesium oxide and calcium oxide.

7. The process according to claim 1 wherein the metal silicate is calcium silicate and the metal compound is calcium oxide.

8. The process of producing a barium silicate pigment containing about 1 mol of BaO chemically combined with about 1 to 2 mols of $SiO_2$ which comprises forming an aqueous slurry containing 1 mol of barium hydroxide per 1 to 2 mols of finely divided, reactive, phylloidal silica containing at least 1 micromol of silanol groups per square meter of flat surface area and a BET surface area of 40 to 130 square meters per gram, heating the slurry at about 100° C. until the reaction is complete and recovering the product.

9. The process of producing a zinc silicate pigment containing about 1 mol of zinc oxide combined with about 1 to 2 mols of $SiO_2$ which comprises forming an aqueous slurry containing 1 mol of zinc oxide per 1 to 2 mols of finely divided, reactive phylloidal silica containing at least 1 micromol of silanol groups per square meter of flat surface area and a BET surface area of 40 to 130 square meters per gram, heating the slurry at about 100° C. until the reaction is complete and recovering the product.

10. The process of producing a magnesium silicate pigment containing about 1 mole of MgO combined with about 1 to 2 mols of SiO$_2$ which comprises forming an aqueous slurry containing 1 mol of MgO per 1 to 2 mols of finely divided, reactive phylloidal silica containing at least 1 micromol of silanol groups per square meter of flat surface area and a BET surface area of 40 to 130 square meters per gram, heating the slurry at about 100° C. until the reaction is complete and recovering the product.

11. The process of producing a lead silicate pigment containing about 1 mol of PbO combined with about 1 to 2 mols of SiO$_2$ which comprises forming an aqueous slurry containing 1 mol of lead oxide per 1 to 2 mols of finely divided, reactive phylloidal silica containing at least 1 micromol of silanol groups per square meter of flat surface area and a BET surface area of 40 to 130 square meters per gram, heating the slurry at about 100° C. until the reaction is complete and recovering the product.

12. The process of producing a calcium silicate pigment containing about 1 mol of CaO combined with about 1 to 2 mols of SiO$_2$ which comprises forming an aqueous slurry containing 1 mol of lime per 1 to 2 mols of finely divided reactive phylloidal silica, containing at least 1 micromol of silanol group per square meter of flat surface area and a BET surface area of 40 to 130 square meters per gram, heating the slurry at about 100° C. until the reaction is complete and recovering the product.

13. The process of producing a calcium-magnesium silicate pigment containing a combined total of about 1 mol of CaO·MgO combined with about 1 to 2 mols of SiO$_2$ which comprises forming an aqueous slurry containing 1 mol of dolomitic lime per 1 to 2 mols finely divided reactive phylloidal silica containing at least 2 micromol of silanol group per square meter of flat surface area and a BET surface area of 40 to 130 square meters per gram, heating the slurry at about 100° C. until the reaction is complete and recovering the product.

14. The process of producing a magnesium silicate pigment containing about 1 mole of MgO combined with about 1 to 2 mols of SiO$_2$ which comprises forming an aqueous slurry containing 1 mol of MgO per 1 to 2 mols of finely divided, reactive phylloidal silica containing at least 20 micromols of silanol groups per square meter of flat surface area and a BET surface area of 300 to 500 square meters per gram, heating the slurry at about 100° C. until the reaction is complete and recovering the product.

15. The process of producing a calcium-magnesium silicate pigment containing a combined total of about 1 mol of CaO·MgO combined with about 1 to 2 moles of SiO$_2$ which comprises forming an aqueous slurry containing 1 mol of dolomitic lime per 1 to 2 mols finely divided reactive phylloidal silica containing at least 20 micromols of silanol group per square meter of flat surface area and a BET surface area of 300 to 500 square meters per gram, heating the slurry at about 100° C. until the reaction is complete and recovering the product.

16. The process of producing a barium silicate pigment containing about 1 mol of BaO chemically combined with about 1 to 2 mols of SiO$_2$ which comprises forming an aqueous slurry containing 1 mol of barium hydroxide per 1 to 2 mols of finely divided, reactive, phylloidal silica containing at least 1 micromol of silanol groups per square meter of flat surface area and a BET surface area of 40 to 130 square meters per gram, boiling the slurry under a pressure of about 120 to 140 p.s.i.g. until the reaction is complete and recovering the product.

17. The process of producing a zinc silicate pigment containing about 1 mol of zinc oxide combined with about 1 to 2 mols of SiO$_2$ which comprises forming an aqueous slurry containing 1 mol of zinc oxide per 1 to 2 mols of finely divided, reactive phylloidal silica containing at least 1 micromol of silanol groups per square meter of flat surface area and a BET surface area of 40 to 130 square meters per gram, boiling the slurry under a pressure of 120 to 140 p.s.i.g. until the reaction is complete and recovering the product.

18. The process of producing a magnesium silicate pigment containing about 1 mole of MgO combined with about 1 to 2 mols of SiO$_2$ which comprises forming an aqueous slurry containing 1 mol of MgO per 1 to 2 mols of finely divided, reactive phylloidal silica containing at least 1 micromol of silanol groups per square meter of flat surface area and a BET surface area of 40 to 130 square meters per gram, boiling the slurry under a pressure of 120 to 140 p.s.i.g. until the reaction is complete and recovering the product.

19. The process of producing a lead silicate pigment containing about 1 mol of PbO combined with about 1 to 2 mols of SiO$_2$ which comprises forming an aqueous slurry containing 1 mol of lead oxide per 1 to 2 mols of finely divided, reactive phylloidal silica containing at least 1 micromol of silanol groups per square meter of flat surface area and a BET surface area of 40 to 130 square meters per gram, boiling the slurry under a pressure of 120 to 140 p.s.i.g. until the reaction is complete and recovering the product.

20. The process of producing a calcium silicate pigment containing about 1 mol of CaO combined with about 1 to 2 mols of SiO$_2$ which comprises forming an aqueous slurry containing 1 mol of lime per 1 to 2 mols of finely divided, reactive phylloidal silica containing at least 1 micromol of silanol group per square meter of flat surface area and a BET surface area of 40 to 130 square meters per gram, boiling the slurry under a pressure of about 120 to 140 p.s.i.g. until the reaction is complete and recovering the product.

21. The process of producing a calcium-magnesium silicate pigment containing a combined total of about 1 mol of CaO·MgO combined with about 1 to 2 mols of SiO$_2$ which comprises forming an aqueous slurry containing 1 mol of dolomitic lime per 1 to 2 mols finely divided reactive phylloidal silica containing at least 1 micromol of silanol group per square meter of flat surface area and a BET surface area of 40 to 130 square meters per gram, boiling the slurry under a pressure of about 120 to 140 p.s.i.g. until the reaction is complete and recovering the product.

22. The process of producing a magnesium silicate pigment containing about 1 mole of MgO combined with about 1 to 2 mols of SiO$_2$ which comprises forming an aqueous slurry containing 1 mol of MgO per 1 to 2 mols of finely divided, reactive phylloidal silica containing at least 20 micromols of silanol groups per square meter of flat surface area and a BET surface area of 300 to 500 square meters per gram, boiling the slurry under a pressure of about 120 to 140 p.s.i.g. until the reaction is complete and recovering the product.

23. The process of producing a calcium-magnesium silicate pigment containing a combined total of about 1 mol of CaO·MgO combined with about 1 to 2 mols of SiO$_2$ which comprises forming an aqueous slurry containing 1 mol of dolomitic lime per 1 to 2 mols finely divided reactive phylloidal silica containing at least 20 micromols of silanol group per square meter of flat surface area and a BET surface area of 300 to 500 square meters per gram, boiling the slurry under a pressure of about 120 to 140 p.s.i.g. until the reaction is complete and recovering the product.

24. A finely divided barium silicate pigment characterized by a crystalline structure, polymorphic particle shape, a particle size in the range of 0.025 to 5 microns in diameter, a BET surface area in the range of 5 to 50 square meters per gram, of which up to 25% is pore area and containing from 1 to 2 mols of SiO$_2$ per mole of BaO.

25. A finely divided zinc silicate pigment characterized by a crystalline structure, polymorphic particle shape, a particle size in the range of 0.025 to 5 microns in diameter, a BET surface area in the range of 40 to 60 square meters per gram, of which up to 10% is pore area and containing 2 moles of SiO$_2$ per mole of ZnO.

26. A finely divided lead silicate pigment characterized by a crystalline structure, polymorphic particle shape, a particle size in the range of 0.025 to 5 microns in diameter, a BET surface area in the range of 5 to 25 square meters per gram, of which up to 15% is pore area and containing from 1 to 2 moles of $SiO_2$ per mole of PbO.

27. A finely divided magnesium silicate pigment characterized by an amorphous structure, polymorphic particle shape, a particle size in the range of 0.025 to 5 microns in diameter, a BET surface area in the range of 300 to 500 square meters per gram of which up to 40% is pore area and containing from 1 to 2 moles of $SiO_2$ per mole of MgO.

28. A finely divided calcium silicate pigment characterized by a crystalline structure, polymorphic particle shape, a particle size in the range of 0.025 to 5 microns in diameter and containing from 1 to 2 moles of $SiO_2$ per mole of CaO.

29. A finely divided calcium-magnesium silicate pigment characterized by a substantially crystalline structure, polymorphic particle shape, a particle size in the range of 0.025 to 5 microns in diameter, a BET surface area in the range of of 180 to 210 square meters per gram and containing 2 moles of $SiO_2$ per 1 mole of $CaO \cdot MgO$.

30. A finely divided metal silicate produced by the reaction of a metal compound selected from the group consisting of metal oxides and hydroxides of barium, lead, magnesium, calcium, zinc and mixtures thereof with a finely divided reactive silica selected from the group consisting of phylloidal silica containing a concentration of silanol groups of at least 1 micromol per square meter of their flat surface area and a BET surface area of 40 to 130 square meters per gram, and phylloidal silica containing a concentration of silanol groups of at least 20 micromols per square meter of their flat surface area and a BET surface area of 300 to 500 square meters per gram, said metal silicates characterized by a polymorphic particle shape, a particle size of from 0.025 to 5 microns, a BET surface area of from 5 to 500 square meters per gram of which from 0% to 40% is pore area, and having a metal oxide to silica molar ratio from about 1 to 4 to about 4 to 1.

References Cited by the Examiner
UNITED STATES PATENTS

| | | | |
|---|---|---|---|
| 2,888,377 | 5/1959 | Allen | 106—306 |
| 3,052,563 | 9/1962 | Vander Linden et al. | 106—306 |

FOREIGN PATENTS

| | | |
|---|---|---|
| 637,622 | 5/1950 | Great Britain. |

TOBIAS E. LEVOW, *Primary Examiner.*

J. E. POER, *Assistant Examiner.*